Sept. 14, 1965 H. A. KURTH 3,206,091

VACUUM SYSTEM FOR TAPE TRANSPORT

Filed April 5, 1963 2 Sheets-Sheet 1

INVENTOR.
HAROLD A. KURTH

BY Robert G. Clay

ATTORNEY

*INVENTOR.*
HAROLD A. KURTH
*BY* Robert G. Clay
*ATTORNEY*

United States Patent Office 3,206,091 Patented Sept. 14, 1965

3,206,091

VACUUM SYSTEM FOR TAPE TRANSPORT

Harold A. Kurth, Woodland Hills, Calif., assignor to Ampex Corporation, Redwood City, Calif., a corporation of California Filed Apr. 5, 1963, Ser. No. 270,955
3 Claims. (Cl. 226—97)

This invention relates to magnetic tape transports and particularly to digital tape transport systems using vacuum chambers for providing low inertia lengths of tape for buffering between high speed drive mechanisms and relatively slower speed supply and takup mechanisms.

For certain applications of magnetic tape systems, such as in digital computers, for example, the magnetic tape transport mechanisms must have the capability of operating bidirectionally and intermittently in order to be closely compatible with the data transfer requirements of modern electronic data processing systems. The tape may have to be driven in one direction and then immediately reversed and driven in the other. Because no data transfer can be effected during start and stop times, and because the start and stop distances generally reduce the effective density with which the data is packed on the tape, the start and stop times and start and stop distances must be minimized as far as possible. At the same time, high tape speeds, which are necessary to high data transfer rates, must be provided in both directions of movement.

In order to meet these severe requirements for mechanical systems, there have been developed a number of tape transport mechanisms in which extremely close control of the tape speed and movement are obtained for most purposes. In typical applications, the reel mechanisms are isolated from the driving mechanisms by passing the tape through vacuum chambers in such fashion that varying length loops of tape are provided in prescribed paths between the driving mechanism and the supply or take-up reel. For bi-directional operation, the driving mechanisms and the vacuum chambers are symmetrically disposed relative to the supply and take-up reels. With a tape loop held in each vacuum chamber on opposite sides of the driving mechanism, which may typically be a conventional capstan and pinch roller mechanism, the tape alone is acted upon during acceleration and deceleration, independently of the motion of the associated supply and take-up reels. In such arrangements, the tape is withdrawn directly from and supplied directly to the vacuum chambers, which therefore provide buffering storage between the driving mechanism and the relatively slower acting, independently driven reels. Servomechanisms operated by sensing means disposed in the vacuum chambers operate the reel drive motors in accordance with the length of the tape loops in the chambers.

These vacuum chamber systems are generally suitable for most high speed digital tape transport applications, but have not proven fully satisfactory in meeting the increasingly severe requirements imposed by modern data systems. In order to obtain greater compatibility between the tape transport system and present day high speed data processing systems, the data transfer rates of the tape transport system must be increased by raising the speed at which the tape is moved and by increasing the effective density of the data stored on the tape. Additionally, the system may have to operate in a sequence of rapidly changing directions, in which the tape is driven forward, reversed, and is stopped in very rapid succession, and without restriction as to the changes which are made, except for inclusion of the proper short delays to insure execution of the last previous command.

When magnetic tape systems using vacuum chambers are operated in this bi-directional and intermittent manner, the resultant rapid changes in the tape loop lengths cause wide variations in the pressures existing within the vacuum systems presently provided. Furthermore, under steady state conditions, undesired vacuum imbalances may exist between the different chambers.

These problems are present in the various available forms of vacuum chamber systems for magnetic tape transports but can become particularly acute in the type of vacuum chamber in which the tape is fed into and withdrawn from the chamber in a central region along the chamber length, and in which the tape loop extends outwardly from the central region toward each of the opposite ends of the chamber. Such a system may be open to the atmosphere or to some selected ambient pressure at the central region, and may have separate vacuum inlets at each end, as described in the patent to Brumbaugh et al., No. 3,074,661. Under steady state conditions, the vacuum in the different chambers tends to become unequal, resulting in undesirable changes in the tension with resulting loop imbalance. Under transient starting and stopping conditions, the vacuum imbalance also exists, causing variations not only in tape tension but in the starting and stopping characteristics of the system. Variations in tape tension result in slippage of the tape on a speed sensing tachometer, which may be used as part of the reel servo system, in addition to producing tape cinch and unevenness of the packing of the tape on the reel. Some of these effects may be compensated for by the use of a vacuum blower of increased size and complexity, but it is preferable instead to reduce the cost of the vacuum source equipment and to avoid the imbalance conditions under static and dynamic operating states in some other way.

It is therefore an object of the present invention to provide an improved magnetic tape transport system using vacuum chambers for high speed, intermittent and bi-directional operation.

Another object of the present invention is to provide an improved vacuum chamber arrangement for digital magnetic tape transports.

Yet another object of the present invention is to provide improved vacuum systems for operation with variable loop, low inertia compliance devices employing vacuums in systems for transporting web or tape material.

These and other objects are achieved, in systems in accordance with the present invention, by the use of low pneumatic impedance couplings between selected points in a vacuum chamber system for magnetic tape transports. As a specific example of such a system, the types of vacuum chambers having central feed and withdrawal points for the magnetic tape, and a pair of oppositely disposed vacuum inlets at each end of each vacuum chamber, are provided with interconnections of low pneumatic impedance between the respective intercoupled vacuum inlets and between each of the vacuum inlets and the vacuum source. These interconnections between the various vacuum inlets and the vacuum source are provided in such fashion as to avoid increased cost of the structure as a whole. The interconnections between the vacuum chambers provide low pneumatic impedance of selected air flow paths of such nature that tendencies of pressure to rise in one chamber are compensated for by concurrent tendencies of the coupled regions of the opposite chamber to decrease in pressure. Thus, pressure variations and tape tension variations existing during transient states are minimized. The interconnections are also such that the pressures at each of the four ports of the vacuum chambers remain substantially equal during static conditions, whereas in prior systems such pressures would tend to differ, thereby causing poor loop balance. By the elimination of the pressure differentials at the different ports by the vacuum system in accordance with the present invention, superior tape loop balance is achieved. In addition, the tape is maintained under a constant selected tension, providing better driving of the speed sensing tachometer and more uniform packing of the tape on the supply and take-up reels.

A particular feature of the invention is the provision of a system including vacuum pressure stabilizing means for maintaining the quiescent or steady state vacuum at a constant selected level. A system incorporating a regulator permits stabilization of the quiescent vacuum level.

A better understanding of the invention may be had by reference to the following description, taken in conjunction with the accompanying drawings, in which.

Figure 1:
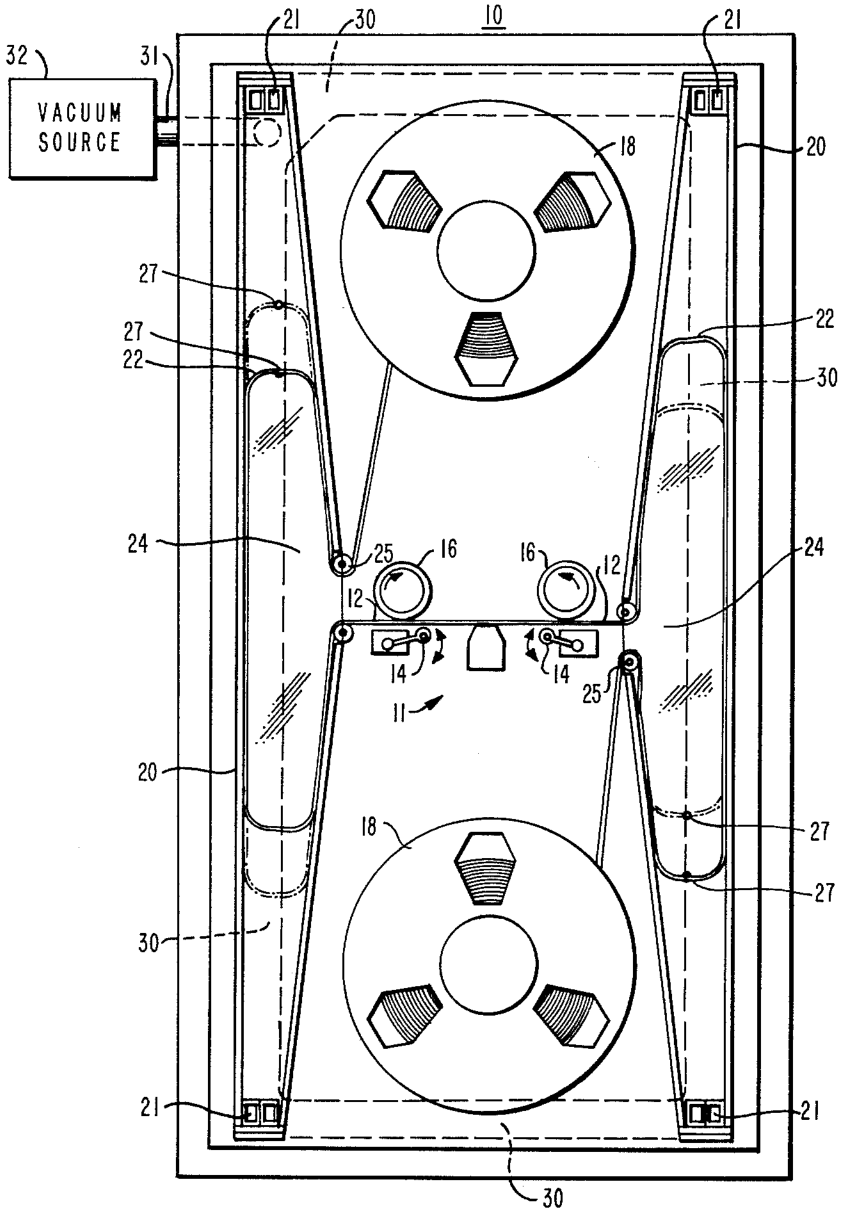
FIGURE 1 is a simplified front view of a tape transport system, showing vacuum chambers with a particular configuration of low pneumatic impedance interconnections in accordance with the present invention.
Figures 2, 3, 4:
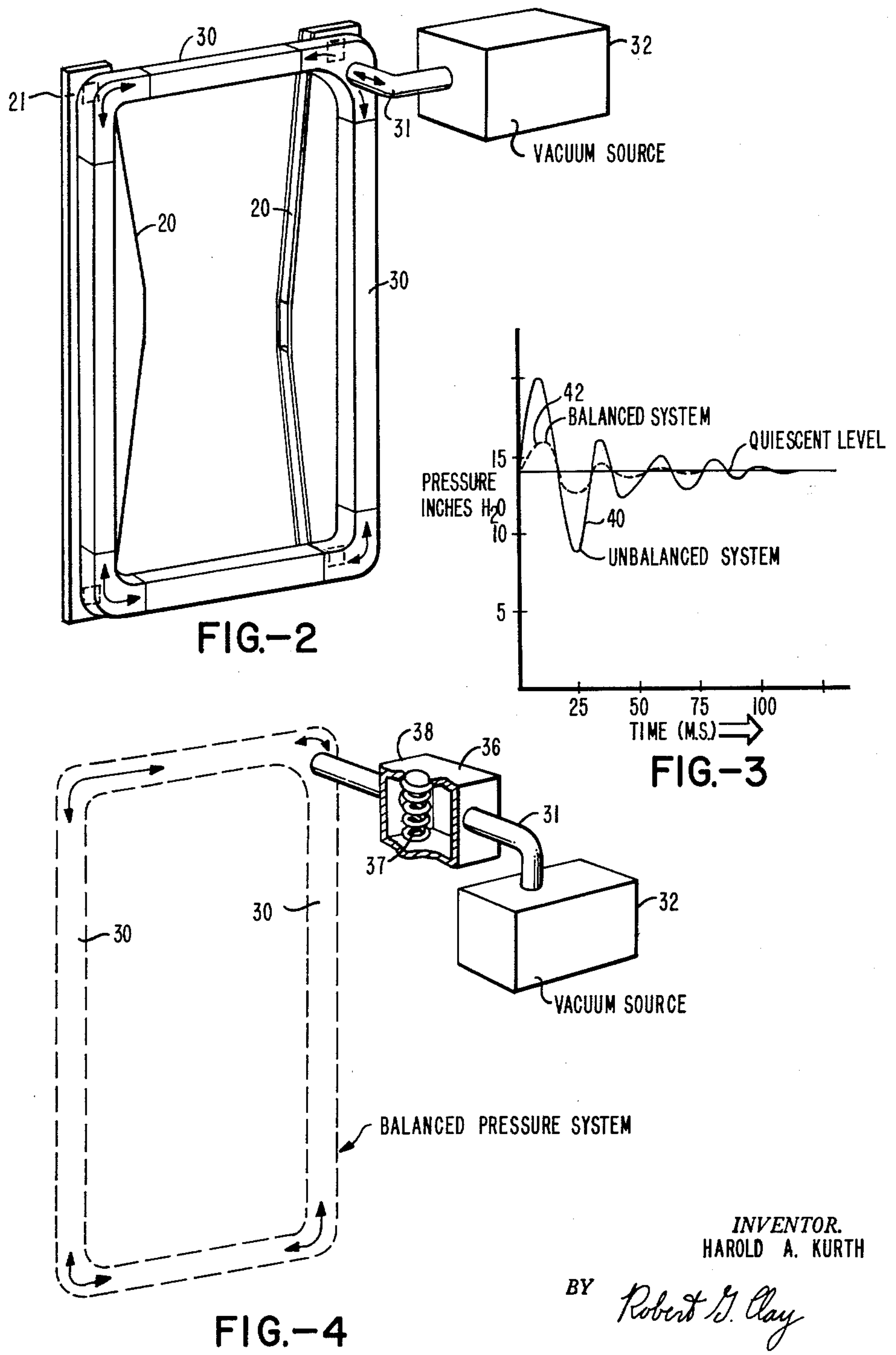
FIGURE 2 is a perspective view of a portion of the back of a tape transport system in accordance with the present invention, showing the pneumatic coupling system in greater detail.
FIGURE 3 is a graph of pressure vs. time for pressure variations encountered in different vacuum chamber systems.
FIGURE 4 is a partial perspective view of a modified form of vacuum supply system for vacuum chamber mechanisms in accordance with the present invention.

The simplified front view of FIGURE 1 and the partial perspective back view of FIGURE 2 illustrate the arrangement of one form of improved vacuum chamber system 10 for tape transports in accordance with the present invention. The principal elements of a high performance magnetic tape transport mechanism 11 are shown in FIGURE 1, as mounted on a front panel. A magnetic tape 12 is advanced past a magnetic head assembly in either direction by engaging either of a pair of selectively operable pinch rollers 14 to an associated capstan 16, with the respective capstans 16 rotating in opposite directions. The arrangement of the tape 12 relative to the capstans 16 and the tape supply and take-up reels 18 is symmetrical, in order that the system may have like starting, stopping and drive characteristics for both directions of movement. Typically, the tape 12 will be brought to full operating speed within a few milliseconds, and stopped in a like time interval. As previously discussed, this high speed starting, stopping and reversal of the tape cannot satisfactorily be accomplished if the tape is to be kept taut between the capstan 16 and the associated reel 18. Because of greater inertia, the reels 18 cannot be started and stopped at comparable rates of speed, and so a mechanical isolating arrangement or buffer in the form of a tape loop 22 is needed between each capstan 16 and the adjacent reel 18. A particularly advantageous form of the mechanism 10 is provided by the double ended, centrally fed, vacuum chambers 20 shown in FIGURE 1. Because the tape 12 is looped out in both directions a relatively long length of tape loop is provided even though the overall arrangement is compact and economical. This form of vacum chamber therefore utilizes a pair of vacuum inlets or ports 21, each disposed at a different closed end of the vacuum chamber 20, with the central region 24 of the vacuum chambers 20 being exposed to the atmosphere or to a selected ambient pressure. Although the chambers 20 are referred to as vacuum chambers, for convenience, and because vacuums are used in most instances, it will be appreciated that the significant factor is the establishment of a pressure differential across the tape loop 22 and that this pressure differential can, if desired, be established by maintaining the central region 24 at higher than atmosphere pressure and by using the ports 21 at each end of the chambers 20 as passages to the atmosphere or to some selected ambient pressure less than that in the central region 24.

With this system as illustrated, the capstans 16 accelerate and only the weight of the tape itself, plus the minor additional factor of frictional forces must be overcome. The relatively slower acting reels 18 are driven by associated servo systems (not shown) which may sense the length of the tape loops 22 in the chambers 20 and in response drive the reels 18 at controlled speeds in either direction, or stop them, as required by operating circumstances. Vacuum sensing apertures 27 are provided in the arrangement shown for coupling to the respective reel drive servo systems. The tape loops 22 are controlled by the system between minimum and maximum positions, as shown, with reel speeds being varied accordingly. The demands on digital tape transports are such that the intermittent starts and stops may occur in arbitrary program sequences, or the tape may be run substantially continuously in a given direction for a relatively extended length of time.

Under both transient start-stop conditions and steady state conditions, the pressure differentials established across the tape loops 22 and the action of the respective vacuum chambers 20 are of significant importance to the successful operation of the system. If the pressure differential varies excessively, or even appreciably, a number of deleterious effects may be encountered in both the transient and static conditions. The loop balance may be adversely affected, and if the imbalance becomes sufficiently great, the loop 22 may be lost or a binding effect may occur. A variation in pressure differential seriously affects the tape tension, and may therefore cause undesirable variations in the packing of the tape on the reels 18 and in the starting and stopping characteristics of the system 10, and further may result in slippage of the tape on a tachometer 25 used at the exit side of each chamber 20 as a part of the reel drive servo system.

In accordance with the present invention, however, these difficulties are overcome and the system is enabled to use a pump of reduced capacity as a vacuum source 32, through balancing of the vacuum chambers 20 by conduits 30 which are arranged in an air connected fashion. These pneumatic conduits 30 couple the top and bottom inlets 21 of each chamber 20, and also interconnect like inlets 21 of opposite chambers 20, so that a closed pneumatic circuit or path is formed as part of the vacuum system 10. In the particular arrangement shown, the couplings 30 comprise a peripheral chamber extending substantially about the edge of the tape system structure and interconnecting all of the ports 21. Low pneumatic impedance paths 30 therefore exist between the opposite ends of each chamber 20 and adjacent ends of each of the two chambers 20, and a low pneumatic impedance path 31 also exists between the vacuum chambers 20 and the vacuum source 32. By "pneumatic impedance," as the term is used herein in the specification and claims, is meant a path offering little interference to, or disruption of, internal gas flow. Thus, by analogy to the term "impedance" as used in elctrical circuit design, a low impedance path results in a relatively high gas flow rate for a given pressure differential in the path.

To understand the operation of this vacuum chamber arrangement under both steady state and transient conditions, let it be assumed first that tape 12 is being pulled out of the left-hand chamber (as seen in FIGURE 1) and fed into the right-hand chamber. The withdrawal of tape 12 from the left-hand chamber 20 at high speed tends to decrease the loop lengths, and therefore decrease the number of air molecules per unit volume in the vicinity of the vacuum inlets, so that the differential pressure across the tape in this chamber 20 increases. Conversely, however, the tape loop in the right-hand chamber 20 tends to increase, decreasing the volume in the vicinity of the chamber ends and increasing the molecules per unit volume, thereby decreasing the differential pressure.

Heretofore, this decrease in differential pressure in the right-hand chamber 20 under these conditions has resulted in very poor loop balance, slippage of the tachometer 25 and loose wrapping of the tape on the adjacent reel 18. The opposite differential pressure conditions existed when the tape 12 was fed in the opposite direction. A contributing factor was that the impedances of the different ports on the two chambers were all different, and additionally contributed to the maintenance under static conditions of different pressures in the different ports of the two chambers. With the present balanced arrangement, however, the start of withdrawal from one of the chambers 20 and concurrent feeding into the other chamber 20 does not result in any objectionable change in the differential pressure in each chamber. The low impedance coupling 30 between the opposed ports 21 of the chambers 20 balances the tendency of the pressure in the vicinity of one port 21 to decrease against the tendency of the pressure in the vicinity of the other port 21 to increase, so that both pressures are counterbalanced and equalized. Therefore, the differential pressures across the tape loops 22 tend to remain the same in both chambers 20 under the transient operating conditions. Systems in accordance with the invention have improved the tape tension uniformity to the degree that tape packing arms may be eliminated.

Under static conditions with previously known vacuum chamber systems, different pneumatic impedances between the respective ports and the source therefor result in loop unbalance. For this reason, the loop extending in one direction toward one end of a chamber might tend to be considerably shorter than that extending toward the opposite end of the chamber. If, after this static condition has resulted in loop unbalance, the tape is then to be withdrawn from a short length of loop or supplied to a long length of loop, there may not be sufficient storage capacity in the tape loop or in the chamber length to retain control of the tape loop, which in turn may cause a loop default condition which places the machine in a standby mode and must be corrected by the operator before the machine is again operable.

The balanced vacuum chamber system in accordance with the present invention, however, stabilizes these pressure variations, in particular by balancing opposed pressure changes against each other, so that under quiescent operating conditions or in the static mode the pressures at all the ports are essentially the same with the advantageous result that the loop balance is held more constant.

The advantages of this arrangement can also be visualized by reference to the graph of FIGURE 3, in which the solid line 40 represents pressure variations encountered with prior art systems. Under transient operating conditions, and with a quiescent pressure level in the chamber 20 of 14 inches of water, the start-stop variations would tend to introduce pressure variations due to the aforementioned effects on the vacuum chambers of up to 6 inches of water, these effects gradually diminishing but still remaining for as long as 60 to 100 milliseconds. In systems in accordance with the present invention, however, as shown by the dotted line curve 42, corresponding transient variations of only 2 inches of water are encountered, and these terminate in a much shorter time.

Another arrangement in accordance with the invention is shown in the simplified perspective view of FIGURE 4, in which like reference numerals have been applied to like parts. In this arrangement, the coupling 31 between the vacuum source 32 and the closed conduit system 30 is made through a pressure regulator valve 36, which is here shown as a spring valve although a number of other forms of regulators may be used. In the form shown, the valve 36 includes a leaf 38 normally held in a closed position by a spring 37. This valve 36 serves as a stabilizer for low frequency variations in the vacuum pressure. The vacuum pressure therefore tends to remain more constant despite variations in the operation of the source or in the operation of the system. If the pressure decreases in the system (the degree of vacuum increases) beyond a predetermined level, the valve leaf 38 opens, admitting air and tending to bring the pressure back to the selected level of vacuum. If the pressure increases in the system, the degree of vacuum is decreased, and the spring valve is closed to permit the vacuum source to lower the pressure and increase the degree of vacuum. This valving arrangement includes stabilization of the quiescent state of the system, but does not materially affect operation under transient conditions.

Although there have been described above and illustrated in the drawings various forms for the improved vacuum systems for tape transports, it will be appreciated that the invention is not limited thereto. Accordingly, the invention should be considered to include all alternative forms, modifications and variations falling within the scope of the appended claims.

What is claimed is:

1. A vacuum chamber system for high performance tape transports comprising a pair of vacuum chambers, each having oppositely disposed closed ends and a central region for receiving and feeding tape, two pairs of vacuum inlet means, each vacuum inlet means of a different pair being disposed in pneumatic coupling relationship to a different end of a different chamber, low pneumatic impedance coupling means forming a continuous closed pneumatic path and coupling each of the vacuum inlet means to each other, and vacuum source means coupled by a low pneumatic impedance path to the coupling means.

2. A system for providing low inertia tape loops for a high performance tape transport comprising a pair of side by side chambers, each having a central region for receiving and feeding tape and a pair of oppositely disposed closed ends, the chambers also including a pair of ports, each positioned in a chamber wall adjacent a different end of the chamber, means for feeding a tape into the central region of each of the chambers and withdrawing the tape from the central region such that the tape is looped substantially symmetrically within the chambers under a differential pressure, vacuum source means, a low pneumatic impedance conduit forming a continuous closed path interconnecting corresponding ports of the two chambers and opposite ends of each chamber, and means coupling the conduit by a low pneumatic impedance path to the vacuum source means.

3. A system as set forth in claim 2 including pressure regulating means in the coupling between the vacuum source means and the conduit.

References Cited by the Examiner

UNITED STATES PATENTS

| | | | |
|---|---|---|---|
| 3,036,786 | 5/62 | Mammel | 242—55.13 |
| 3,074,661 | 1/63 | Brumbaugh et al. | 226—195 |

FOREIGN PATENTS

| | | |
|---|---|---|
| 1,163,105 | 4/58 | France. |
| 563,795 | 6/57 | Italy. |

M. HENSON WOOD, Jr., *Primary Examiner.*

RAPHAEL M. LUPO, ROBERT B. REEVES, *Examiners.*